United States Patent
Drazynski et al.

(10) Patent No.: US 9,723,509 B2
(45) Date of Patent: *Aug. 1, 2017

(54) SMALL CELL MOBILITY ENHANCEMENT

(71) Applicant: Nokia Solutions and Networks Oy, Espoo (FI)

(72) Inventors: Karol Drazynski, Wroclaw (PL); Klaus Doppler, Berkeley, CA (US); Juha Korhonen, Espoo (FI); Esa Malkamaki, Espoo (FI); Lars Dalsgaard, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 14 days.

This patent is subject to a terminal disclaimer.

(21) Appl. No.: 14/978,214

(22) Filed: Dec. 22, 2015

(65) Prior Publication Data

US 2016/0112911 A1    Apr. 21, 2016

Related U.S. Application Data

(63) Continuation of application No. 14/113,230, filed as application No. PCT/EP2011/056601 on Apr. 27, 2011, now Pat. No. 9,247,444.

(51) Int. Cl.
*H04W 24/10* (2009.01)
*H04W 36/00* (2009.01)
*H04W 36/04* (2009.01)
*H04W 84/04* (2009.01)

(52) U.S. Cl.
CPC ....... *H04W 24/10* (2013.01); *H04W 36/0061* (2013.01); *H04W 36/0094* (2013.01); *H04W 36/04* (2013.01); *H04W 84/045* (2013.01)

(58) Field of Classification Search
None
See application file for complete search history.

(56) References Cited

U.S. PATENT DOCUMENTS

| | | | |
|---|---|---|---|
| 2009/0047960 A1 | 2/2009 | Gunnarsson et al. | 455/436 |
| 2009/0092107 A1 | 4/2009 | Cai et al. | 370/338 |
| 2009/0247150 A1 | 10/2009 | Fischer et al. | 455/425 |
| 2010/0323633 A1 | 12/2010 | Pani et al. | 455/67.14 |
| 2011/0080962 A1 | 4/2011 | Blankenship et al. | 375/259 |
| 2012/0015657 A1 | 1/2012 | Comsa et al. | 455/436 |
| 2013/0059610 A1 | 3/2013 | Siomina et al. | 455/456.6 |

FOREIGN PATENT DOCUMENTS

EP    2 262 315 A1    12/2010
WO    WO 2011/041753 A2    4/2011

*Primary Examiner* — Gary Mui
(74) *Attorney, Agent, or Firm* — Harrington & Smith

(57) ABSTRACT

There is provided a method, an apparatus and a computer program product, wherein the method comprises applying at least one procedure for inter-frequency measurements of at least one carrier, wherein a first procedure is applied when a carrier having at least one cell deployed for providing non-continuous coverage radio access is to be measured and a second procedure is applied when a carrier having at least one cell deployed for providing continuous coverage radio access is to be measured, and performing the inter-frequency measurements according to the applied procedure, when the procedure for the inter-frequency measurements is on.

20 Claims, 4 Drawing Sheets

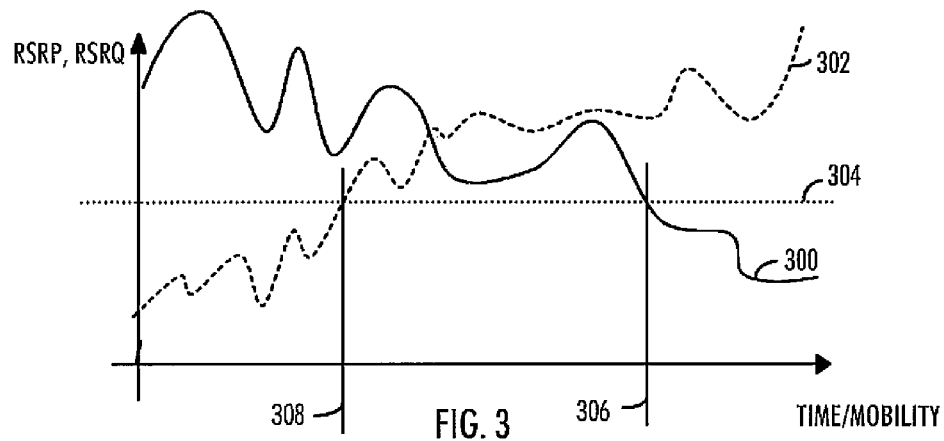
FIG. 3
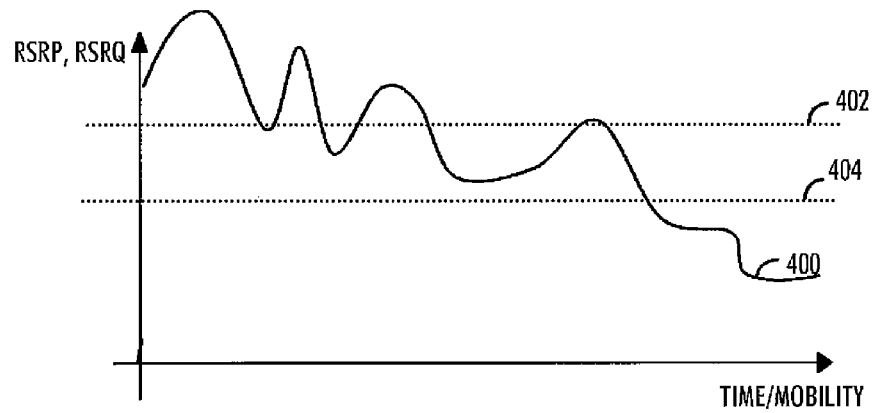
FIG. 4
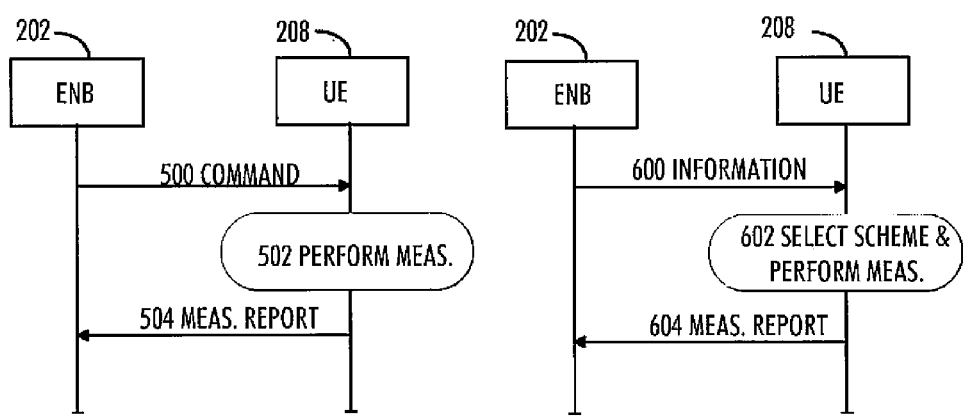
FIG. 5
FIG. 6

SMALL CELL MOBILITY ENHANCEMENT

CROSS REFERENCE TO RELATED APPLICATION

This application is a continuation of U.S. patent application Ser. No. 14/113,230 (filed on Oct. 22, 2013 and issued as U.S. Pat. No. 9,247,444 on Jan. 26, 2016) which is a US national stage application of International Patent Application PCT/EP2011/056601 (filed on Apr. 27, 2011).

FIELD

The invention relates generally to mobile communication networks. More particularly, the invention relates to detecting small cells deployed on a separate carrier.

BACKGROUND

In radio communication networks, such as the Long Term Evolution (LTE) or the LTE-Advanced (LTE-A) of the $3^{rd}$ Generation Partnership Project (3GPP), network planning comprises the use of common base stations (Node B, NB or evolved node B, eNB) for providing a macro cell coverage. In addition, small cell coverage areas may be provided to user equipment (UE) by locally deployed base stations. The small cells may comprise, for example, micro cells, pico cells and femto cells. Situations may occur when the US is in the coverage area of both a large cell and a small cell.

Thus, it is important to provide a solution for mobility management of the UE located in the coverage area of both the large and the small cell.

BRIEF DESCRIPTION OF THE INVENTION

Embodiments of the invention seek to improve mobility management between large and small cells. Some aspects of the invention are defined by the claims.

LIST OF DRAWINGS

In the following, the invention will be described in greater detail with reference to the embodiments and the accompanying drawings, in which FIG. 1 presents a network according to an embodiment;

FIG. 3 shows how signal strength varies in time;

FIG. 4 illustrates how to apply different threshold levels for a first and a second procedure, according to an embodiment;

FIG. 5 illustrates a flow diagram for signaling between an eNB and a UE, according to an embodiment;

FIG. 6 illustrates a flow diagram for signaling between an eNB and a UE, according to another embodiment;

FIG. 8 illustrates an embodiment of gap-assisted measurements with discontinuous reception on;

Figure 9:
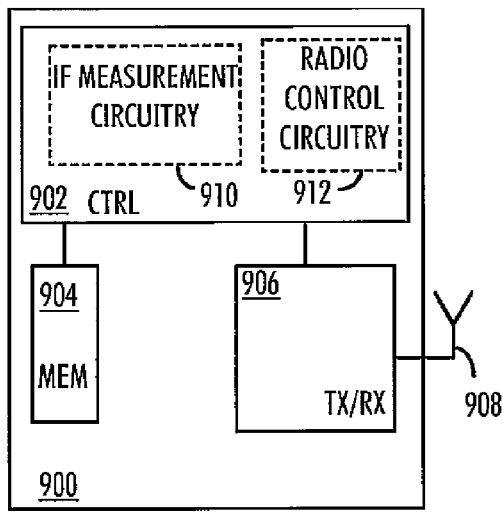
Figure 10:
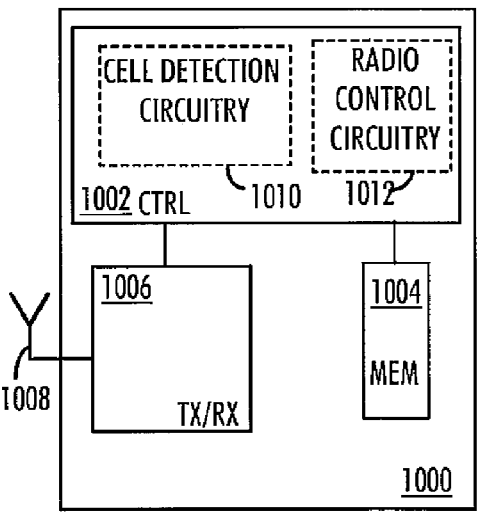
Figure 11:
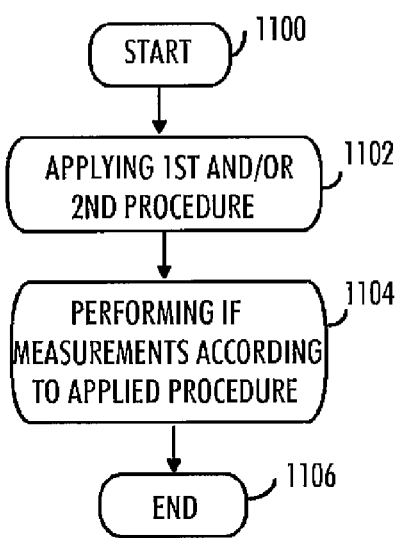

FIG. 9 presents an apparatus according to an embodiment;

FIG. 10 presents an apparatus according to an embodiment;

FIG. 11 show a method according to an embodiment; and

Figure 12:
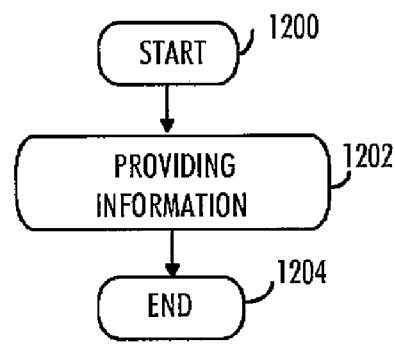

FIG. 12 illustrate a method according to an embodiment.

DESCRIPTION OF EMBODIMENTS

The following embodiments are exemplary. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments. Radio communication networks, such as the Long Term Evolution (LTE) or the LTE-Advanced (LTE-A) of the $3^{rd}$ Generation Partnership Project (3GPP), are typically composed of at least one base station (also called a base transceiver station, a Node B, or an evolved Node B, for example), a user equipment (also called a user terminal and a mobile station, for example) and optional network elements that provide the interconnection towards the core network. The base station connects the UEs via the so-called radio interface to the network.

Figure 1:
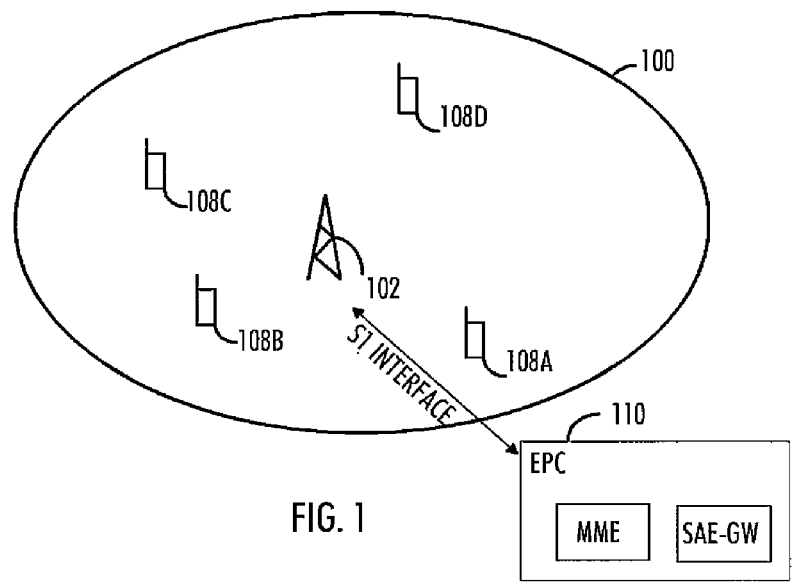

FIG. 1 shows a communication network, according to an embodiment. As explained, the communication network may comprise a base station 102. The base station 102 may provide radio coverage to a cell 100, control radio resource allocation, perform data and control signaling, etc. The cell 100 may be a macrocell, a microcell, or any other type of cell where radio coverage is present. Further, the cell 100 may be of any size or form, depending on the antenna system utilized.

In general, a base station 102 applicable to the embodiments may be configured to provide communication services according to at least one of the following communication protocols: Worldwide Interoperability for Microwave Access (WiMAX), Universal Mobile Telecommunication System (UMTS) based on basic wideband-code division multiple access (W-CDMA), high-speed packet access (HSPA), LTE, and/or LTE-A. The base station 102 may additionally provide the second generation cellular services based on GSM (Global System for Mobile communications) and/or GPRS (General Packet Radio Service). The present embodiments are not, however, limited to these protocols.

The base station 102 may be used in order to provide radio coverage to the cell 100. The base station 102 may be seen as one communication point of the network. The base station 102 may be node B, evolved node B (eNB) as in LTE-A, a radio network controller (RNC), or any other apparatus capable of controlling radio communication and managing radio resources within the cell 100. The base station 102 may also have an effect on mobility management by controlling and analyzing radio signal level measurements performed by a user terminal, carrying out its own measurements and performing handover based on the measurements.

For the sake of simplicity of the description, let us assume that the base station is an eNB. The development of the evolved universal mobile telecommunication's system (UMTS) terrestrial radio access network (E-UTRAN), which is the air interface of the LTE, is concentrated on the eNB 102. All radio functionality is terminated here so that the eNB 102 is the terminating point for all radio related protocols. The E-UTRAN may be configured such that orthogonal frequency division multiple access (OFDMA) is applied in downlink transmission, whereas single carrier frequency division multiple access (SC-FDMA) may be applied in uplink, for example. In the case of multiple eNBs in the communication network, the eNBs may be connected to each other with an X2 interface as specified in the LTE.

The eNB 102 may be further connected via an S1 interface to an evolved packet core (EPC) 110, more specifically to a mobility management entity (MME) and to a system architecture evolution gateway (SAE-GW). The MME is a control plane entity for controlling functions of non-access stratum signaling, roaming, authentication, tracking area list management, etc., whereas the SAE-GW handles user plane functions including packet routing and forwarding, E-UTRAN idle mode packet buffering, etc. The user plane-bypasses the MME directly to the SAE-GW. The SAE-GW may comprise two separate gateways: a serving gateway (S-GW) and a packet data network gateway (P-GW). The MME controls the tunneling between the eNB and the S-GW, which serves as a local anchor point for the mobility between different eNBs, for example. The S-GW may relay the data between the eNB and the P-GW, or buffer data packets if needed so as to release them after appropriate tunneling has been established to a corresponding eNB. Further, the MMEs and the SAE-GWs may be pooled so that a set of MMEs and SAE-GWs may be assigned to serve a set of eNBs. This means that an eNB may be connected to multiple MMEs and SAE-GWs, although each user terminal is served by one MME and/or S-GW at a time.

According to an embodiment, the eNB 102 may establish a connection with a user equipment (UE) 108A to 108D such as a mobile user terminal, a palm computer, or any other apparatus capable of operating in a mobile communication network. That is, the UE 108A to 108D may perform data communication with the eNB 102.

In radio communication networks, it is not rare that certain environments are left without sufficient coverage or capacity. This may be the case even though being located within the coverage area of the cell. These environments may include, for example, homes or offices. As a solution to provide sufficient coverage and/or capacity to these types of areas, a radio coverage area may be provided by a cell deployed for providing non-continuous coverage radio access. These types of cells typically have limited coverage area. For this reason they may also be called cells deployed for providing a local area radio access. Exemplary cells of this type include pico cells and possibly even micro cells deployed by an operator, as well as cells provided by a private base station such as a Home Node B (HNB) or Home evolved Node B (HeNB), a private access point, a closed access base station, femtocells, or the likes.

For the sake of simplicity, let us assume that a HeNB is deployed for providing local radio access. The HeNB (or the private base station) may be any apparatus capable of providing coverage and controlling radio communication within the corresponding small cell or cells controlled by the HeNB. The HeNBs may be set up, for example, by an end user of a mobile communication network, such as a subscriber of a network provider. The HeNBs may be, for example, in an active state, a sleep mode, a transition state, they may be switched off temporarily, or the like. However, the HeNB differs from a public eNB such that the HeNB may be installed by a private user and may be deployed in an un-coordinated manner. Typically, the user deployed HeNB and operator deployed pica cells and possibly micro cells provide radio coverage to a smaller cell area than the macro eNB 102. For this reason, let us refer to these types of cells deployed for providing non-continuous or more localized coverage radio access as small cells, as they generally provide coverage to a smaller area than a public macro base station. A user terminal may benefit from an increased capacity by connecting to a small cell and communicating with the HeNB, or a like, of the small cell, instead of communicating directly with the public eNB.

The eNB 102 of FIG. 1 may be a public base station that provides radio coverage to a cell deployed for providing continuous or large area coverage radio access. Generally, base stations, such as the eNB 102 of FIG. 1, provide radio coverage to large cells, such as to macro cells or to micro cells, for continuous radio access. For this reason, let us refer to these cells deployed for providing continuous coverage radio access as large cells. These types of cells may also be called cells deployed for providing a wide area radio access.

Figure 2A:
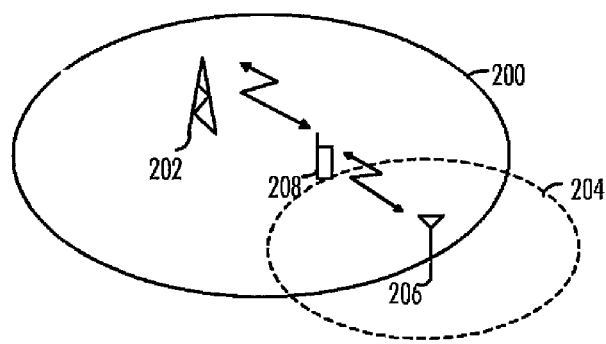
FIG. 2A shows another network according to an embodiment.

According to an embodiment as shown in FIG. 2A, a heterogeneous network is illustrated where a user equipment (UE) is in the coverage area a large cell 200 and a small cell 204. The large cell may be deployed for providing continuous coverage radio access and the small cell may be deployed for providing non-continuous coverage radio access, as explained above. The radio access to the large cell 200 may be provided by a public base station, such as an eNB 202. The radio access to the small cell 204 may be provided by a HeNB 206, for example. The radio access of the small cell 204 may be on same or on a different carrier than the radio access of the large cell 200. For example, the carrier of the large cell 200 may be operating on a frequency division duplexing (FDD) band whereas the carrier of the small cell 204 may be operating on a time division duplexing (TDD) band. Further, the radio access of the small cell 204 may be the same or a different radio access technology (RAT) than the radio access on the large cell 200.

As shown in FIG. 3, due to the movement of the UE 208, a reference signal received power (RSRP) and/or a reference signal received quality (RSRQ) may vary over time/mobility as shown on axis 300. A curve 300 depicts the RSRP or RSRQ, as the case may be, of the reference signal of the eNB 202 as the UE 208 moves in the area. There may come a point when the RSRP 300 decreases so much that radio communication with the eNB 202 is not possibly or advantageous anymore. Therefore, a handover may be needed. The handover may be established to another eNB. However, often the handover is advantageous to be performed to a small cell 204 within the large cell 200 or even outside the large cell 200.

In order to enable the handover to be performed, the UE 208 may perform inter-frequency measurements to discover whether a small cell 204 is sufficiently strong in the current location of the UE. The inter-frequency measurements may be done on downlink physical channels for at least one frequency that differs from the frequency of the active (current) carrier frequency. Therefore, the measurement object may correspond to one cell, a group of cells, or all cells operating on the corresponding frequency.

For example, it can be assumed that the UE moves to an area where the current frequency coverage of the large cell 200 is about to end. At this particular point the UE may perform the inter-frequency measurement and, as a result, move to the new carrier frequency of the small cell 204 as soon as possible to avoid the loss of call. Therefore, it is advantageous to perform the inter-frequency measurements as the possibly resulting handover may lighten the traffic present on the source cell, enable continuation of the radio communication, etc.

Figure 2B:
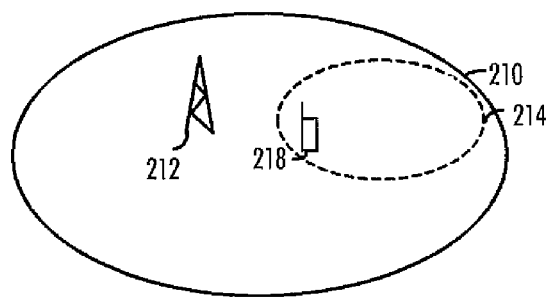
FIG. 2B shows another network according to an embodiment.

In addition to providing extra coverage, small cells are often used for providing extra capacity and/or offloading possibility. In these cases, from the UE mobility point of view, there is not a big hurry—or no need at all—to perform the measurements in order to find the small cells. However, from the capacity and offloading point of view, it is useful and often desirable to find the small cells as soon as possible. In an embodiment, as shown in FIG. 2B, a small cell 214 is well inside the coverage area of the large cell 210. Then the UE 218 may receive a strong or good enough signal from the eNB 212 of the large cell 210 everywhere inside the coverage area of the small cell 214. The received signal level, e.g. RSRP of the eNB 212, may even exceed the threshold that network has set for triggering the measurements for mobility. If this happens, the small cell 214 is not discovered at all even if it would be useful for data offloading. Alternative would be that inter-frequency measurements are activated in a more continuous manner while connected to eNB 212. This alternative though have rather significant drawbacks e.g. on the expected user data throughput and UE power consumption.

The small cells (e.g. pica cells or femto cells) may be distributed in different areas of the large cell (e.g. a macro cell) coverage area, such as to different distance from the eNB or even just unknown locations on another carrier. Therefore it is challenging and sometimes even not possible for the network to set the measurement configuration such that thresholds for activating a gap-assisted inter-frequency measurements are set appropriately so that handovers may be conducted in an early stage, yet without draining the battery life of the UE 208/218.

For this reason, it is proposed to enable the UE 208/218 to perform inter-frequency measurements in such a way that the procedure for the inter-frequency measurements (e.g. how often or how accurate the measurements are performed) applied depends on the measurement target (e.g. radio access technologies, cell types). The procedure may comprise performing measurements according to a predetermined cycle (i.e. rate). In an embodiment, the UE 208/218 applies at least one procedure for the inter-frequency measurements of at least one carrier, wherein a first procedure is applied when a carrier having at least one cell deployed for providing non-continuous coverage radio access is to be measured and a second procedure is applied when a carrier having at least one cell deployed for providing continuous coverage radio access is to be measured. In order to efficiently use small cells for offloading, the inter-frequency measurement procedure for small cells is different from the inter-frequency measurement procedure for large cells. This is advantageous as it allows for more efficient detection of small cells without draining the battery life of the UE with constant measurements.

Thus, it is proposed that the UE may distinguish between carriers or cells deployed for providing continuous coverage radio access (large cells, such as macro cells and possibly micro cells, cells used for providing good mobility experience and basic seamless connectivity, for example) and carriers or cells deployed for providing non-continuous coverage radio access (small cells, such as pico cells, HNBs, HeNBs, and possibly micro cells, cells used for improving the instantaneous data rates, for example). The distinction between large and small carriers/cells may be done based on carrier information, neighbor lists or based on the physical cell identification (ID), as will be explained later.

In an embodiment, the UE, 208/218 may determine whether or not to set the procedure for the inter-frequency measurements on. Alternatively, the UE may be configured to apply the procedure, for example. Then the UE 208/218 may perform the inter-frequency measurements according to the applied procedure, when the procedure for the inter-frequency measurements is on. As a result, the UE 208/218 obtains results on the RSRP/RSRQ of the target cell. Moreover, the inter-frequency measurements are performed optimally with respect to the target cell. This ensures that the battery life of the UE is not drained and that the possibly offloading is done sufficiently early in order to take full benefit of the resources and capacity of the large cell and of the small cell.

Consequently, the UE 208/218 may provide a measurement report to the eNB 202. In an embodiment, when the UE measures a small cell, the UE 208/218 indicates in the measurement report that the inter-frequency measurement corresponding to the measurement report has been performed for a cell deployed for providing non-continuous coverage radio access (small cell). Thus, the report may indicate that the measurement is a result of a "start small cell inter-frequency measurement"-message sent from eNB. Any other corresponding message may be used by the eNB to inform the UE about the need to perform measurements according to the first procedure (corresponding to the small cells). Alternatively, when the UE 208/218 makes the inter-frequency measurement autonomously, the report may indicate e.g. with a predetermined bit that the measurement was done for a small cell. The eNB 202 receiving the measurement report may be regarded as a normal measurement report and optionally trigger a handover to the measured cell to benefit from the offloading effect. Thus, the eNB 202 may offload at least one user equipment to the measured small cell. Whether to offload the UE 208/218 or not, may depend on RSRP/RSRQ levels of the current carrier and of the target carrier, the traffic situation, etc. In addition to or instead of the measurement report may trigger the configuration of inter-frequency measurement gap pattern to measure the cell more accurately.

In an embodiment, the UE 208/218 may, as shown in FIG. 5, receive a command 500 (e.g. a RRC message) to perform the inter-frequency measurement according to the first procedure, that is the procedure that corresponds to the cell deployed for non-continuous radio access. The command 500 may be received from the eNB 200 on the carrier from the current serving cell 200. The command 500 may be a dedicated message or similar kind of indication, such as a "start small cell inter-frequency measurement"-message. The command 500 may further contain a list of carriers or potentially a detailed cell list to be measured. The UE 208/218 may then perform inter-frequency measurements according to the first procedure at step 502 and send a measurement report 504 to the eNB 202/212.

Alternatively, or in addition, the UE 208/218 may as shown in the embodiment of FIG. 6, obtain information 600 from the eNB 202/212 or from some other network entity, such as from an access network discovery and selection function (ANDSF), on whether the non-continuous coverage radio access is available in the current location or not. As a result, the UE 208/218 may then in step 602 select the procedure of the inter-frequency measurement based on whether the non-continuous coverage radio access is available or not. If there are only small cells available, the UE 208/218 may apply the first procedure. On the other hand, if there is no small cell available (i.e., only large cells), the UE 208/218 may apply the second procedure. If both are available, then UE may decide to use the first procedure for the small cells and the second procedure for the large cells. Therefore, when measurement gap patterns are applied, this may lead to a case where the UE 208/218 applies two measurement gap-patterns, one for the first procedure corresponding to the small cells and another for the second procedure corresponding to the large cells. The eNB 202/212 may inform the UE 208/128 whether to apply only one or two gap patterns and the configuration of the gap pattern(s). Alternatively, the UE 208/218 may be pre-configured with the information related to the two gap patterns so that the eNB 202/212 need not inform the configuration to the UE 208/218. In yet another embodiment, the UE 208/218 or the eNB 202/212 may prioritize the first measurement procedure (for the small cells) over the second measurement procedure (for the large cells) in case there are both large and small cells on the same frequency. Thus, in this embodiment, if there are both the large cell and the small cell present, the UE 208/218 performs measurements according to the small cell procedure (first procedure) only. After it is known which of the first or the second procedure to apply, the UE 208/218 performs the inter-frequency measurements based on the first and/or the second procedure.

The UE 208/218 may obtain the information 600 about the type of cells present on the current location in various manners. The distinction between the available cells may be done based on carriers, neighbor lists or based on the physical cell ID, for example.

In an embodiment, the UE 208/218 is provided information on available carriers and the carriers identify the cell type (large/small). The carriers may further identify the radio access technology type (GMS, UMTS, 3GPP, WLAN, etc.). Then the UE 208/218 will know which procedure to follow when performing the inter-frequency measurements. In an embodiment, the UE 208/218 receives a neighbor list containing information on the cells deployed for providing non-continuous coverage radio access in the current location. The UE may receive two neighbor lists. One neighbor list contains information for macro cells and possibly micro cells for which the UE 208/218 applies the second procedure of the inter-frequency measurements. The other neighbor list contains information for small cells for which the UE 208/218 applies the first procedure. The neighbor list may be a list of RATs and carriers, or contain in addition more detailed information like physical cell IDs. In an embodiment, the neighbor list contains the frequency channel of the carriers to be measured and other necessary information. In this case the UE 208/218 may already start measuring small cells and the "start measurement"-command may be omitted, thus saving signaling overhead. In any case, the UE 208/218 will know which procedure to follow when performing the inter-frequency measurements. The UE 208/218 will also know all frequencies that are to be measured, in case there are several carriers.

In an embodiment, the UE 208/218 receives information on physical cell identifications assigned to the cells deployed for providing non-continuous coverage radio access (small cells). This is especially useful for co-channel deployments of large and small cells in order to distinguish between them but also when small cells are on separate carrier. The UE 208/218 may be signaled a range of physical cell IDs that are reserved for the small cells. The physical cell IDs may be assigned by the Operation and Maintenance Unit (O&M) and the UE 208/218 may use the same configuration also in the case of a handover to a neighboring cell. The data of physical cell ID may also be in the System Information Block that indicates if it is a small cell. The UE 208/218 may receive information on at least one of the following: the start physical cell ID, the end physical cell ID, the carrier frequencies, the RAT provided by each of the carriers, for example. Also in this case the UE 208/218 may already start measuring small cells and the "start measurement"-command may be omitted, thus saving signaling overhead. Then the UE 208/218 will know which procedure to follow when performing the inter-frequency measurements. The UE 208/
218 will also know all frequencies/physical Ids that are to be measured, in case there are several carriers.

Let us take another look at FIG. 3. As said, the curve 300 represents the RSRP or RSRQ of the current carrier signal. A curve 302 represents the RSRP or RSRQ of a carrier signal to be measured. Let us assume that the carrier to be measured is from a small cell, that is, from a cell deployed for non-continuous radio access. As explained, the network may command the UE to initiate the inter-frequency measurement. In addition, the network may define triggers for flexible activation and deactivation of inter-frequency measurements. This is to ensure that the UE 208/218 need not spend time and energy measuring another carrier (or radio access technology) when the signal in the serving cell is sufficiently good. Additionally it may ensure that the network may limit the time when measurement gaps are activated, thus reducing the possible negative impact on the actual data transmission.

In an example of FIG. 3, when the signal quality or power (RSRP/RSRQ) in the serving large cell, as shown with curve 300, drops below a predetermined threshold 304 at point 306, the UE starts measuring the carrier of the small cell. As a result, a handover to the small cell may be initiated. However, this may lead to a case where the small cell will be discovered much later than when it could be taken into use by the UE 208/218. Thus, much of the offloading opportunity of the cell may be lost. As can be seen from FIG. 3, had the measurements been performed already at point 308 (when the RSRP/RSRQ 302 of the small cell carrier exceeds the threshold 304), the UE 208/218 would have been offloaded to the target cell earlier at point 308 as sufficient target cell strength is present already at point 308. However, if the UE 208/218 would be configured to perform inter-frequency measurements all the time, the measurements may drain the battery of the UE. Additionally, it may have negative impact on the actual data transmission. Having different procedures of the inter-frequency measurements for the small cells and for the large cells, as proposed, at least partially solves the above described problem.

This is because, in an embodiment as shown in FIG. 4, the UE 208/218 sets the procedure for the inter-frequency measurements on when the signal quality and/or the signal power of the current carrier 400 decreases to a predetermined threshold level 402 or 404, wherein a higher predetermined threshold level is applied for the first procedure than for the second. In other words, if the UE 208/218 applies the first procedure, the inter-frequency measurements are triggered on earlier than they would be had the UE 208/218 been using the second procedure intended for the large cells. As a consequence, if the UE 208/218 is to detect and measure a small cell carrier, the measurements will be triggered as soon as the current carrier RSRP level 400 (or a time-average value thereof) sinks below the threshold 402. The UE 208/218 need not wait until the threshold 404 is crossed. In other words, the UE 208/218 measures the small cells with a higher RSRP/RSRQ trigger (threshold) level than for the large cells. Thus, the possible handover resulting from the measurement report is conducted in an early stage and capacity and resources are optimally utilized.

In an embodiment, the eNB may provide information of the threshold levels for triggering the inter-frequency measurement procedure, wherein the threshold levels are separate for the first procedure and for the second procedure.

In another embodiment, there is no threshold set for triggering the inter-frequency measurements according to the first procedure. Thus, the UE 208/218 may have the first procedure for the inter-frequency measurements on continuously. This may take place such that the UE 208/218 keeps it on continuously after it has been set on, or so that the first procedure is on by default without the UE 208/218 having to set it on at any point. This option saves signaling overhead as no information regarding the threshold levels need to be sent.

By having a higher threshold (or no threshold) for the first procedure, the inter-frequency measurements for the small cells are active more often (or even continuously) than for the large cells. As the UE may often have the first procedure for measuring the small cells set on, the inter-frequency measurements performed according to the first procedure are, according to an embodiment, less frequent than the inter-frequency measurements performed according to the second procedure aimed for measuring the large cells. Therefore, in an embodiment, the inter-frequency measurements are performed less frequently in the first procedure than in the second procedure.

In yet another embodiment, the UE 208/218 sets the first procedure on when the currently serving cell is overloaded, i.e. the UE 208/218 does not get sufficient resources or the eNB 202/212 indicates an overload situation.

It is possible to configure gap-assisted inter-frequency measurements meaning that during a gap, the UE need not receive at the carrier of serving cell but is free to tune its receiver for measurements on other carriers. When gap-assisted inter-frequency measurements are applied in the first procedure, measurement gaps may be active in a more continuous manner (or even continuously) than they would in the second procedure. Also for non-gap-assisted measurements there may be benefits from less strict cell detection requirements for offloading cases than for mobility related measurements.

It is also possible that the UE 208/218 is operating under discontinuous reception (DRx)-method meaning that the UE 208/218 and the network negotiate phases in which data transfer occurs. During other times the UE 208/218 may turn its receiver off and enter a low power state. This way, battery life is further saved.

In an embodiment, when discontinuous reception is off and the first procedure (corresponding to the small cells) is set on, a cycle which comprises the following is repetitively carried out: performing predetermined number of time-separated inter-frequency measurements, and restraining from performing inter-frequency measurements for a predetermined time duration exceeding the time-separation after the predetermined number of inter-frequency measurements have been done. Thus, the inter-frequency measurements are distinct in time domain. The measurements may be gap-assisted, for example.

Figure 7:
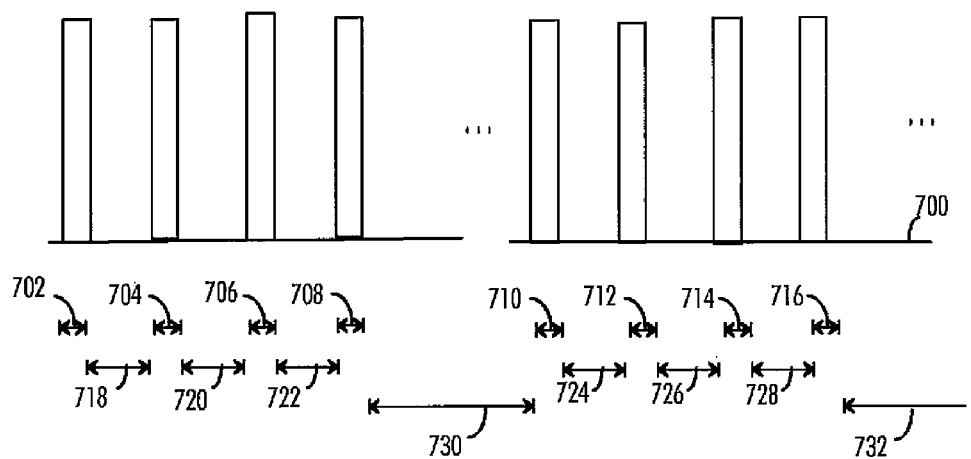
FIG. 7 illustrates an embodiment of gap-assisted measurements with discontinuous reception off.

This is shown in FIG. 7 wherein a number of measurements gaps 702 to 716 are allocated on a time axis 700. In the example as shown in FIG. 7, the predetermined number of measurements to be performed comprises four inter-frequency measurements. Thus, in FIG. 7 a first set of predetermined number of time-separated measurements comprises inter-frequency measurements 702 to 708 and a second set comprises inter-frequency measurements 710 to 716. It should also be noted that each inter-frequency measurements 702 to 716 may itself contain measurements of only one cell or several cells. Between the measurements in each set, there are breaks during which no inter-frequency measurements are allocated (corresponding to the time separation). These breaks are shown with reference numerals 718 to 722 for the first set and with reference numerals 724 to 728 for the second set. For example, the measurement gap pattern, according the embodiment, may include four gaps 702 to 708, each having a 6 ms time duration. The breaks 718 to 722 between the gaps 702 to 708 may be of 34 ms. Thus, the aggregate time duration of a gap and a break may be 40 ms. After the UE 208/218 has performed the predetermined number of inter-frequency measurements, the UE 208/218 needs not to perform any measurements for a predetermined time duration 730 exceeding the time-separation of 34 ms. This time duration may be one minute or a half minute, for example. After the time duration has elapsed, the UE 208/218 may have/receive another set (second set) of measurement gaps of similar pattern (i.e., four gaps 710 to 716 having breaks 724 to 728 between the gaps 710 to 716). Thereafter, a predetermined time duration 732 of, for example, one minute is waited before a third set is triggered. Compared with a currently specified gap patterns in LTE active mode, the UE 208/218 has less measurement gaps and a higher throughput can be reached.

According to current specifications, if DRx is configured on, the UE may take one measurement sample in every DRx cycle or perform one measurement during five DRx cycles. The maximum DRx cycle may be 2 seconds and the UE may need to perform a measurement on each frequency at least once every $5*N_f*$DRx cycle length, where $N_f$ is the number of frequencies to scan. This drastically drains battery power. For a case with the gap-assisted measurements and DRx configured on, in an embodiment it is proposed that, when the first procedure (corresponding to the small cells) is set on, the UE 208 restrains from performing inter-frequency measurements in every predetermined discontinuous reception cycle. For example, the UE 208/218 may restrain from performing measurements repeatedly in every DRx cycle. Therefore, battery life is saved without sacrificing offloading capabilities.

In an embodiment, when the first procedure is on, the UE 208/218 performs inter-frequency measurements, each separated from another in time by a predefined time separation, only in at least two of the last predetermined number of discontinuous reception cycles of a predetermined time duration exceeding the aggregate time duration of the last predetermined number of discontinuous reception cycles and at least one predefined time separation. For example, instead of measuring every DRx cycle, the UE 208/218 performs inter-frequency measurements in only the last, for example, five DRx cycles in each minute. Keeping in mind that maximum DRx duration is configured to be 2 seconds, the one minute period exceeds aggregate duration of $(5-1)*2$ s+2 s=10 seconds. In another example of the embodiment, the five measurements are done in the last 20 DRx cycles, i.e. measuring only every fifth DRx cycle. In yet another exemplary embodiment, the UE 208/218 performs inter-frequency measurements in only the last, for example, five DRx cycles in every five minutes. This may be the case when a long DRx cycle of, for example, two seconds is configured.

Figure 8:
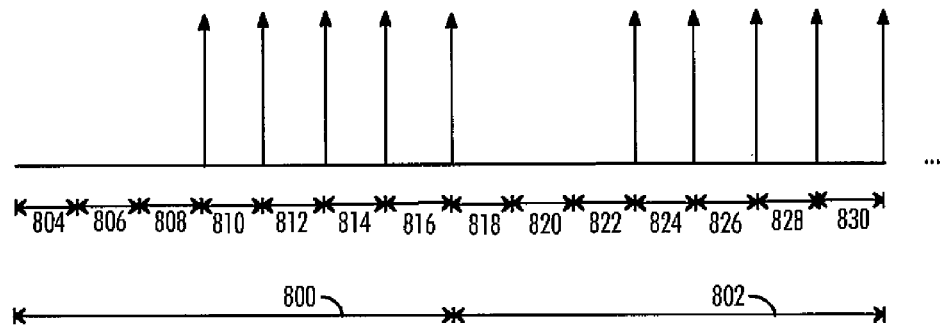

This is shown in FIG. 8, where the inter-frequency measurements (shown with arrows) are performed only in the last five DRx cycle periods 808 to 816 and 822 to 830 of a predetermined time duration 800 and 802, respectively. It can also be seen that the predetermined time duration 800 and 802 exceeds the aggregate time duration of the five DRx cycles and at least one predefined time separation, wherein the predefined time separation is the separation between, for example, inter-frequency measurement done in the DRx cycles 812 and 814 corresponding to one DRx cycle. During the DRx cycles 804, 806, 818 and 820 no inter-frequency measurements are performed. Of course, there may be much more than two DRx cycles for which no measurements are done in each predetermined time duration 800 and 802, but for the sake of simplicity only two are shown in FIG. 8. For example, when only every fifth DRx cycle is measured during the last, for example, 20 DRx cycles, there may be tens of DRx cycles in between the predetermined time durations 800 and 802 during which no measurements are performed. In another embodiment, the UE 208/218 produces a measurement result for each frequency in a measurement period that is larger of {one minute, 5*$N_f$*DRx cycle}. Then, the total number of DRx cycles the UE 208/218 may spend for measurements during one measurement period may depend on the number of scanned frequencies $N_f$ and the accuracy requirements. Thus, the cycle according to which the inter-frequency measurements are to be performed may be selected according to a predefined criterion.

In an embodiment, the eNB 202/212 may receive a request for a measurement gap configuration to measure the cell deployed for providing non-continuous coverage more accurately than currently. Thus, the UE 202/218 may transmit such a request to the eNB 202/212. The request may be a proximity indication message. Alternatively, when UE reports that it has identified a small cell, the network may configure more frequent measurement gaps.

It should be noted that in principle, the UE is allowed do the measurements whenever it wants. However, for inter-frequency measurements typically measurement gaps are needed which are configured by the network. Thus one aspect of this invention is which kind of measurement gap patterns the network configures for the UE. The current specifications only has two possible measurement gap patterns: a gap of 6 ms every 40 ms or every 80 ms. According to some embodiments of the invention, new patterns are proposed, e.g., FIGS. 7 and 8. In order to configure these patterns, the following parameters may be signaled to the UE: the length of the gap (702, 704, etc. in FIG. 7, this may be the same 6 ms but also longer or shorter are possible), the interval between the gaps (810, 812 etc. in FIGS. 8 and 702+718 or 718 in FIG. 7), the number of gaps per pattern (four in FIG. 7 and five in FIG. 8) and the length of the pattern (800, 802 in FIG. 8) or alternatively the length of the "empty" interval between gaps (730, 732 in FIG. 7). Furthermore, an alternative gap pattern may be, e.g., five equally spaced gaps during 30 s, or 1 min, i.e., a gap every 6 s or every 12 s, for instance. The important point here is that for small cell discovery purposes, a new measurement gap pattern is introduced which pattern has significantly less gaps and thus does not disturb ongoing data transmission in large cell (for active UE) or cause significant extra power consumption (for less active UE).

As said earlier, the eNB or the network in general may use a message to inform the UE about the configuration of the gap pattern(s) to be applied in the first procedure and/or in the second procedure. The network may use either new message formats to inform this or it may apply the existing messaging (or enhanced version of that). By doing this, it is enabled that the current measurement configuration is enhanced with an additional gap pattern (according to the first procedure, for example) and/or ability to link/limit this pattern to be used e.g. with a given carrier.

A very general architecture of apparatuses according to embodiments of the invention is shown in FIGS. 9 and 10. FIGS. 9 and 10 show only the elements and functional entities required for understanding the apparatuses. Other components have been omitted for reasons of simplicity. The implementation of the elements and functional entities may vary from that shown in FIGS. 9 and 10. The connections shown in FIGS. 9 and 10 are logical connections, and the actual physical connections may be different. The connections can be direct or indirect and there can merely be a functional relationship between components. It is apparent to a person skilled in the art that the apparatuses of FIGS. 9 and 10 may also comprise other functions and structures.

An apparatus 900, such as a user equipment, for performing the inter-frequency measurements according to the selected procedure may comprise a processor 902. The processor 902 may be implemented with a separate digital signal processor provided with suitable software embedded on a computer readable medium, or with a separate logic circuit, such as an application specific integrated circuit (ASIC). The processor 902 may comprise an interface, such as computer port, for providing communication capabilities. The processor 902 may be, for example, a dual-core processor or a multiple-core processor.

The apparatus 900 may comprise a memory 904 connected to the processor 902. However, memory may also be integrated to the processor 902 and, thus, no memory 904 may be required. The memory may be used to store information related to the first and the second procedure, the DRx cycles, gap-assisted measurements, information related to physical IDs of the cells, frequencies of the carriers, etc.

The apparatus 900 may further comprise a transceiver (TRX) 906. The TRX 906 may further be connected to one or more antennas 908 enabling connection to and from an air interface. The apparatus 900 may use the TRX 906 to receive the carrier to be measured, to receive information related to the measurement or to the selection of the procedure, and to transmit measurement reports to the network, for example.

The processor 902 may comprise an inter-frequency measurement circuitry 910 for selecting and/or applying the procedure of the inter-frequency measurements, possibly determining whether to set the procedure on or not, and performing the inter-frequency measurements according to the applied procedure, for example. The processor 902 may also comprise a radio control circuitry 912 for performing at least one of the following tasks: radio management, RSRP/RSRQ evaluation, radio channel measurements and power control, etc.

An apparatus 1000, such as an eNB, may comprise a processor 1002. The processor 1002 may be implemented with a separate digital signal processor provided with suitable software embedded on a computer readable medium, or with a separate logic circuit, such as an application specific integrated circuit (ASIC). The processor 1002 may comprise an interface, such as computer port, for providing communication capabilities. The processor 1002 may be, for example, a dual-core processor or a multiple-core processor.

The apparatus 1000 may comprise a memory 1004 connected to the processor 1002. However, memory may also be integrated to the processor 1002 and, thus, no memory 1004 may be required. The memory may be used to store information related to physical IDs of the cells, frequencies of the carriers, the DRx cycles, gap-assisted measurements, radio access technologies of each carrier, etc.

The apparatus 1000 may further comprise a transceiver (TRX) 1006. The TRX 1006 may further be connected to one or more antennas 1008 enabling connection to and from an air interface. The apparatus 1000 may use the TRX 1006 to receive measurement reports from the UE, to transmit information related to the measurement or to the selection of the procedure, for providing information indicating that a carrier of a cell deployed for providing non-continuous coverage radio access is available. The TRX 1006 may provide at least one of the following: a neighbor list containing information on the cells deployed for providing non-continuous coverage radio access in the current location of the user equipment, information on physical cell identifications assigned to the cells deployed for providing non-continuous coverage radio access, information about a carrier having at least one cell deployed for providing non-continuous coverage radio access is to be measured when performing inter-frequency measurements, and information about at least one carrier for which an inter-frequency measurement procedure should be applied which inter-frequency measurement procedure is different from the inter-frequency measurement procedure applied for other carriers, for example.

The processor 1002 may comprise a cell detection circuitry 1010 for detecting which cells are present in the area. This information may be used when transmitting the identification information to the UE, for example. The cell detection circuitry 1010 may also facilitate in providing information indicating that a carrier of a cell deployed for providing non-continuous coverage radio access is available (explicitly or implicitly) or is to be measured when performing inter-frequency measurements. The cell detection circuitry 1010 may also aid in providing at least one of the following: the neighbor list containing information on the cells deployed for providing non-continuous coverage radio access in the current location of the user equipment, and information on physical cell identifications assigned to the cells deployed for providing non-continuous coverage radio access. Alternatively or in addition to, the information may be available even without cell detection circuitry, e.g., the information may have been provided by O&M. The processor 1002 may also comprise a radio control circuitry 1012 for: radio resource management and power control, for example.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

FIG. 11 illustrates a method for applying the procedure of the inter-frequency measurements. The method starts in step 1100. In step 1102, the method comprises applying at least one procedure for inter-frequency measurements of at least one carrier, wherein a first procedure is applied when a carrier having at least one cell deployed for providing non-continuous coverage radio access is to be measured and a second procedure is applied when a carrier having at least one cell deployed for providing continuous coverage radio access is to be measured. In step 1106 the inter-frequency measurements are performed according to the applied procedure, when the procedure for the inter-frequency measurements is on. The method ends in step 1108.

FIG. 12 illustrated a method of providing information to the UE. The method starts in step 1200. In step 1202 the method comprises providing at least one of the following: a neighbor list containing information on the cells deployed for providing non-continuous coverage radio access in the current location of the user equipment, information on physical cell identifications assigned to the cells deployed for providing non-continuous coverage radio access, information about a carrier having at least one cell deployed for providing non-continuous coverage radio access is to be measured when performing inter-frequency measurements, and information about at least one carrier for which an inter-frequency measurement procedure should be applied which inter-frequency measurement procedure is different from the inter-frequency measurement procedure applied for other carriers. The inter-frequency measurement procedure to be applied for the at least one carrier may be the first procedure while the second procedure is applied for the other carriers. The method ends in step 1204.

The embodiments of the invention offer many advantages. The proposed solution may be used to guarantee inter-frequency measurements of small cells without draining the battery of a UE and with reduced signaling. It allows energy efficient small cell discovery on a different carrier, small cell inter-frequency measurements independent from triggers used for large cell inter-frequency measurements to ensure close to optimal offloading. Moreover, the procedures defined for current gap-assisted measurements patterns may be reused or modified.

The techniques and methods described herein may be implemented by various means. For example, these techniques may be implemented in hardware (one or more devices), firmware (one or more devices), software (one or more modules), or combinations thereof. For a hardware implementation, the apparatuses of FIGS. 9 and 10 may each be implemented within one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. For firmware or software, the implementation can be carried out through modules of at least one chip set (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Thus, according to an embodiment, the apparatus comprises means for performing any of the tasks of FIGS. 1 to 12. The means may comprise, for example, processing means, interfacing means, transmitting means, and receiving means configured to perform any of the tasks of FIGS. 1 to 12.

Embodiments of the invention may be implemented as computer programs according to the embodiments of the invention. The computer programs comprise instructions for executing a computer process. The computer program implemented may carry out, but is not limited to, the tasks related to FIGS. 1 to 12.

The computer program may be stored on a computer program distribution medium readable by a computer or a processor. The computer program medium may be, for example but not limited to, an electric, magnetic, optical, infrared or semiconductor system, device or transmission medium. The computer program medium may include at least one of the following media: a computer readable medium, a program storage medium, a record medium, a computer readable memory, a random access memory, an erasable programmable read-only memory, a computer readable software distribution package, a computer readable signal, a computer readable telecommunications signal, computer readable printed matter, and a computer readable compressed software package.

Even though the invention has been described above with reference to an example according to the accompanying drawings, it is clear that the invention is not restricted thereto but can be modified in several ways within the scope of the appended claims. Further, it is clear to a person skilled in the art that the described embodiments may, but are not required to, be combined with other embodiments in various ways.

We claim:

1. A method, comprising:
    applying at least one procedure for inter-frequency measurements of at least one carrier, wherein a first procedure is applied when a carrier associated with a first type of cell is to be measured and a second procedure is applied when a carrier associated with a second type of cell is to be measured, wherein the inter-frequency measurements are performed less frequently in the first procedure than in the second procedure; and
    performing the inter-frequency measurements according to the applied procedure, when the procedure for the inter-frequency measurements is on.

2. The method of claim 1, further comprising:
    receiving a command to perform the inter-frequency measurement according to the first procedure.

3. The method of claim 1, further comprising:
    obtaining information on whether the non-continuous coverage radio access is available in the current location or not; and
    selecting the procedure of the inter-frequency measurement based on whether the non-continuous coverage radio access is available or not.

4. The method of claim 3, further comprising receiving at least one of following:
    a neighbor list containing information on the cells deployed for providing non-continuous coverage radio access in the current location, and
    information on physical cell identifications assigned to the cells deployed for providing non-continuous coverage radio access.

5. The method of claim 1, further comprising:
    setting the procedure for the inter-frequency measurements on when the currently serving cell is overloaded or the signal quality and/or the signal power of the current serving cell decreases to a predetermined threshold level, wherein a higher predetermined threshold level is applied for the first procedure than for the second.

6. The method of claim 1, further comprising:
    having the first procedure on continuously.

7. The method of claim 1, wherein the first type of cell is deployed for providing non-continuous coverage radio access and the second type of cell is deployed for providing continuous coverage radio access.

8. The method of claim 1, wherein, when discontinuous reception is off and the first procedure is on, a cycle which comprises the following is repetitively carried out:
    performing predetermined number of time-separated inter-frequency measurements by applying gap-assisted inter-frequency measurements; and
    restraining from performing inter-frequency measurements for a predetermined time duration exceeding the time-separation after the predetermined number of inter-frequency measurements have been done.

9. The method of claim 1, further comprising, when discontinuous reception is on and the first procedure is on:
    restraining from performing inter-frequency measurements in every predetermined discontinuous reception cycle.

10. The method of claim 1, further comprising:
    providing a measurement report indicating that the inter-frequency measurement corresponding to the measurement report has been performed for the carrier associated with the first type of cell.

11. The method of claim 1, further comprising:
    causing a transmission of a proximity indication or a request for a measurement gap configuration to measure the cell deployed for providing non-continuous coverage more accurately than currently.

12. A method, comprising:
    providing information about a plurality of procedures for inter-frequency measurements, wherein a first procedure is applied when a carrier associated with a first type of cell is to be measured and a second procedure is applied when a carrier associated with a second type of cell is to be measured, wherein the inter-frequency measurements are performed less frequently in the first procedure than in the second procedure; and thereafter
    receiving at least one measurement report comprising results of interfrequency measurements according to the first or the second procedure.

13. The method of claim 12, further comprising:
    providing information of threshold levels for triggering the inter-frequency measurement procedure, wherein the threshold levels are separate for the first procedure and for the second procedure, wherein the first type of cell is deployed for providing non-continuous coverage radio access and the second type of cell is deployed for providing continuous coverage radio access.

14. An apparatus, comprising:
    at least one processor and at least one memory including a computer program code, wherein the at least one memory and the computer pro-gram code are configured to, with the at least one processor, cause the apparatus at least to:
        apply at least one procedure for inter-frequency measurements of at least one carrier, wherein a first procedure is applied when a carrier associated with a first type of cell is to be measured and a second procedure is applied when a carrier associated with a second type of cell is to be measured, wherein the inter-frequency measurements are performed less frequently in the first procedure than in the second procedure; and perform the inter-frequency measurements according to the applied procedure, when the procedure for the inter-frequency measurements is on.

15. The apparatus of claim 14, wherein the apparatus is further caused to:
receive a command to perform the inter-frequency measurement according to the first procedure.

16. The apparatus of claim 14, wherein the apparatus is further caused to:
obtain information on whether the non-continuous coverage radio access is available in the current location or not; and
select the procedure of the inter-frequency measurement based on whether the non-continuous coverage radio access is available or not.

17. The apparatus of claim 16, wherein the apparatus is further caused to receive at least one of following:
a neighbor list containing information on the cells deployed for providing non-continuous coverage radio access in the current location, and
information on physical cell identifications assigned to the cells deployed for providing non-continuous coverage radio access.

18. The apparatus of claim 14, wherein the apparatus is further caused to:
set the procedure for the inter-frequency measurements on when the currently serving cell is overloaded or the signal quality and/or the signal power of the current serving cell decreases to a predetermined threshold level, wherein a higher predetermined threshold level is applied for the first procedure than for the second.

19. The apparatus of claim 14, wherein the apparatus is further caused to:
have the first procedure on continuously.

20. The apparatus of claim 14, wherein the first type of cell is deployed for providing non-continuous coverage radio access and the second type of cell is deployed for providing continuous coverage radio access.

* * * * *

UNITED STATES PATENT AND TRADEMARK OFFICE
CERTIFICATE OF CORRECTION

| | | |
|---|---|---|
| PATENT NO. | : 9,723,509 B2 | Page 1 of 1 |
| APPLICATION NO. | : 14/978214 | |
| DATED | : August 1, 2017 | |
| INVENTOR(S) | : Karol Drazynski et al. | |

It is certified that error appears in the above-identified patent and that said Letters Patent is hereby corrected as shown below:

In Claim 3:
Column 15, Line 46, "whether the" should be deleted and --whether-- should be inserted.

In Claim 16:
Column 17, Line 10, "whether the" should be deleted and --whether-- should be inserted.

Signed and Sealed this
Twenty-sixth Day of September, 2017

Joseph Matal
*Performing the Functions and Duties of the*
*Under Secretary of Commerce for Intellectual Property and*
*Director of the United States Patent and Trademark Office*